US010412353B2

(12) United States Patent
Kuji et al.

(10) Patent No.: US 10,412,353 B2
(45) Date of Patent: Sep. 10, 2019

(54) PROCESSING APPARATUS AND IMAGE PROJECTING METHOD

(71) Applicant: Sony Interactive Entertainment Inc., Tokyo (JP)

(72) Inventors: Takuya Kuji, Tokyo (JP); Takeshi Yamagishi, Kanagawa (JP); Jun Sakamoto, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/131,692

(22) Filed: Apr. 18, 2016

(65) Prior Publication Data
US 2017/0302897 A1   Oct. 19, 2017

(51) Int. Cl.
*H04N 9/31*    (2006.01)
*A63F 1/00*    (2006.01)
*G06F 3/0488*  (2013.01)
*G06F 3/01*    (2006.01)
*G06F 3/03*    (2006.01)
*G06F 3/044*   (2006.01)

(52) U.S. Cl.
CPC ............ *H04N 9/3188* (2013.01); *A63F 1/00* (2013.01); *G06F 3/011* (2013.01); *G06F 3/0304* (2013.01); *G06F 3/044* (2013.01); *G06F 3/0488* (2013.01); *H04N 9/3185* (2013.01); *H04N 9/3194* (2013.01); *G06F 2203/04808* (2013.01); *G06T 2207/30204* (2013.01)

(58) Field of Classification Search
CPC ......... A63F 13/08; A63F 13/214; A63F 13/27
USPC ........ 348/744, 61, 135, 92, 96; 463/11, 1, 5; 235/494, 462.09
See application file for complete search history.

(56) References Cited

U.S. PATENT DOCUMENTS 7,661,601 B2 *  2/2010  Takano ................. A63F 1/02
                                             235/494
2008/0090658 A1   4/2008  Kaji
2015/0085155 A1 * 3/2015  Diaz Spindola ...... G06T 19/006
                                             348/222.1

FOREIGN PATENT DOCUMENTS

JP   2002102529 A    4/2002
JP   2002247602 A    8/2002
JP   2003330615 A   11/2003
JP   2005143657 A    6/2005
(Continued)

OTHER PUBLICATIONS

Office Action for corresponding JP Patent Application No. 2013-215815, 5 pages, dated Mar. 8, 2016.
(Continued)

*Primary Examiner* — Jefferey F Harold
*Assistant Examiner* — Jean W Desir
(74) *Attorney, Agent, or Firm* — Matthew B. Dernier, Esq.

(57) ABSTRACT

A processing apparatus includes a processing section acquiring a position in which a card is placed, and a rendering control section controlling projection of an image by a projection apparatus. On the basis of the position in which the card is placed, the rendering control section causes the projection apparatus to project the image associated with the card onto the card in a manner larger than the card. An image projecting method includes acquiring a position in which a card is placed, and on the basis of the position in which the card is placed, causing a projection apparatus to project an image associated with the card onto the card in a manner larger than the card.

6 Claims, 15 Drawing Sheets

(56) References Cited

FOREIGN PATENT DOCUMENTS

| | | | |
|---|---|---|---|
| JP | 2006288721 A | 10/2006 |
| JP | 2008183212 A | 8/2008 |
| JP | 2008212697 A | 9/2008 |
| JP | 2009112638 A | 5/2009 |
| JP | 2010253252 A | 11/2010 |
| JP | 2011240147 A | 12/2011 |
| WO | 2006041149 A1 | 4/2006 |

OTHER PUBLICATIONS

Office Action for corresponding JP Patent Application No. 2013-215815, 7 pages, dated Aug. 18, 2015.
Office Action for corresponding JP Patent Application No. 2016246442, 8 pages, dated Dec. 5, 2017.
Office Action for corresponding JP Patent Application No. 2013-215815, 13 pages, dated Oct. 4, 2016.

\* cited by examiner

10a

10a

10e

10e

PROCESSING APPARATUS AND IMAGE PROJECTING METHOD

BACKGROUND

The present disclosure relates to a technology for projecting an image from a projection apparatus such as a projector on a real object such as a card.

There has been proposed an image processing technology for taking an image of a two-dimensional code by a video camera, recognizing the two-dimensional code and displaying a three-dimensional image for the two-dimensional code on a display apparatus. An example of the proposed technology is described in WO2006/041149A1 (hereinafter referred to as patent document 1). Patent document 1 discloses a rectangular card provided with a two-dimensional code configured to include a reference cell, a code data portion and a plurality of corner cells laid out to surround the code data portion.

SUMMARY

In recent years, a trading card game (collectable card game) machine has been becoming popular very fast at places such as a game center, a toy store and a supermarket. A trading card game is a game in which the user collects cards and shows cards to an opponent also showing cards to the user. Each card is a card on which a variety of pictures and a variety of characters have been drawn. Examples of the pictures and the characters drawn on a card are an original monster and an animation character. A characteristic value has been set on a card. The characteristic value is a value for expressing typically the capability of a character, attributes of the character and the like. In accordance with a card shown by the user, the game is carried forward and a victory or a defeat is determined.

The inventor of the present disclosure paid attention to such a card game and discovered possibility to raise the sauce of the card game by providing a good visual effect to a card or cards placed on a table or the like.

It is desirable to present a technology for providing a good visual effect to a card or cards.

In order to solve the problem described above, a mode of the present disclosure implements a processing apparatus including a processing section acquiring a position in which a card is placed, and a rendering control section controlling projection of an image by a projection apparatus. On the basis of the position in which the card is placed, the rendering control section causes the projection apparatus to project the image associated with the card onto the card in a manner larger than the card.

What are obtained by translating arbitrary combinations of the above-described constituent elements and expressions of the present disclosure among method, device, system, recording medium, computer program, and so forth are also effective as modes of the present disclosure.

DETAILED DESCRIPTION OF THE PREFERRED EMBODIMENTS

The disclosure will now be described by reference to the preferred embodiments. This does not intend to limit the scope of the present disclosure, but to exemplify the disclosure.

The present disclosure provides a technology for projecting an image from a projection apparatus such as a projector on a real object placed on a table or the like. In the present embodiment, the real object is a plate card having front and rear surfaces. The present embodiment is used in explanation of a technology for projecting an image on the plate card. In place of the plate card, however, the real object can also be an object having a three-dimensional shape. A marker for identifying a card is added to the card. When a card detecting sensor detects the marker of a card, a processing apparatus controls an illumination light pattern of the projection apparatus so that the projection apparatus projects an image associated with the card on the card. The marker is configured as a one-dimensional or two-dimensional pattern such as a code or a picture. The image to be projected on a card can be a static image. By using a moving image for game rendering as an image to be projected on a card, however, it is possible to obtain a better visual effect.

Figure 1:
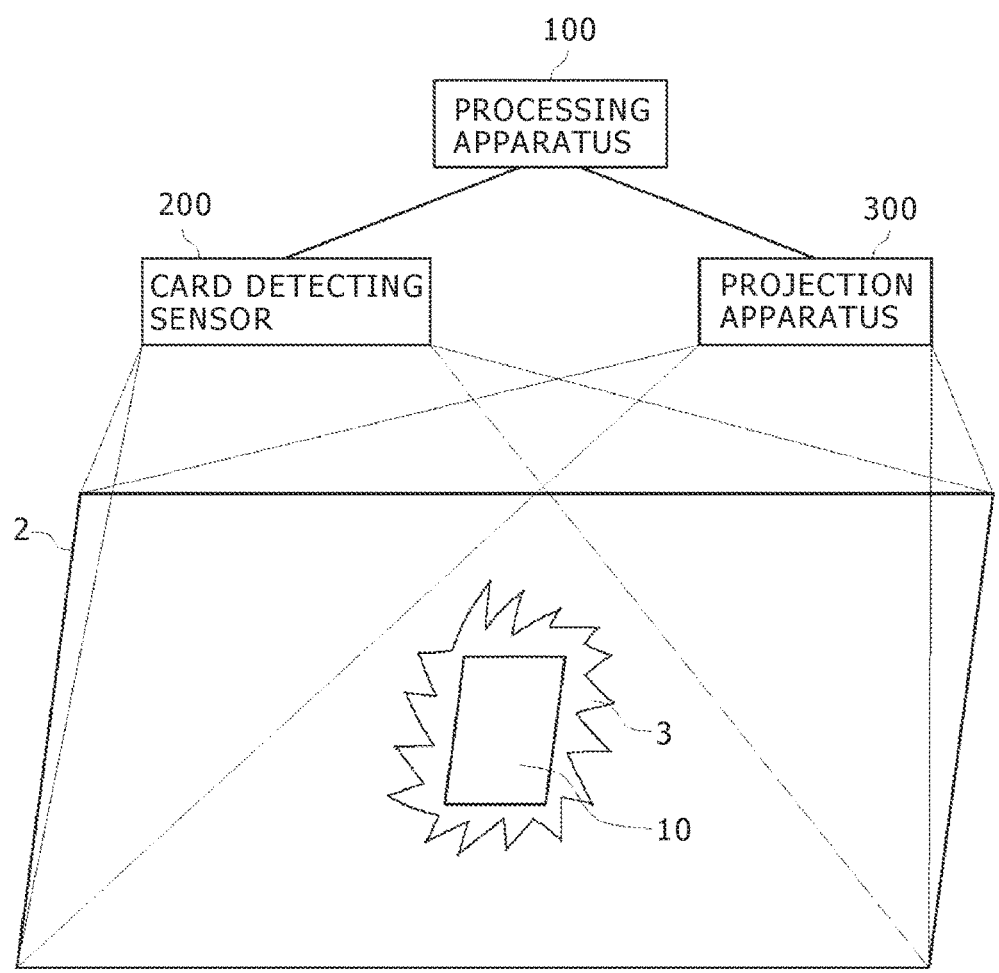
FIG. 1 is a diagram showing the configuration of an image projection system according to an embodiment of the present disclosure.

FIG. 1 is a diagram showing the configuration of an image projection system 1 according to an embodiment of the present disclosure. In the image projection system 1, a card placement area 2 is formed. The user places a card 10 in the card placement area 2. Typically, the card placement area 2 is an area enclosed by a frame printed on a table. The card placement area 2 is formed so that the user is capable of visually recognizing the area in which the card 10 can be placed. The card placement area 2 can be formed so that the user can place a plurality of cards 10 in the card placement area 2. In the case of a fight game, the card placement area 2 can be formed so that a plurality of users can each place the card 10 in the card placement area 2.

A card detecting sensor 200 is a sensor for detecting the card 10 placed in the card placement area 2. To put it more concretely, the card detecting sensor 200 is a sensor for detecting a marker added to the card 10 placed in the card placement area 2. It is desirable to provide such a configuration that the card detecting sensor 200 is capable of detecting the card 10 regardless of the position at which the card 10 is placed in the card placement area 2. As will be described later, the card detecting sensor 200 can be an invisible-light sensor embedded typically in an image taking apparatus or a display apparatus. As an alternative, the card detecting sensor 200 can also be a touch sensor embedded in a multi-touch electrostatic-capacitance touch panel. As another alternative, the card detecting sensor 200 can also be an NFC (Near Field Communication) reader having a near field communication function.

A proper card detecting sensor 200 is selected in accordance with the card 10 to be detected and/or the marker of the card 10. FIG. 1 shows a configuration in which the card detecting sensor 200 is positioned above the card placement area 2. However, it is possible to place the card detecting sensor 200 below or inside the card placement area 2.

As described above, the card placement area 2 is an area enclosed by a frame. However, the card placement area 2 demarcates an area in which the user can place the card 10. Thus, in this embodiment, an area in which the card 10 can be detected by the card detecting sensor 200 may be referred to as the card placement area 2.

A projection apparatus 300 is an apparatus for projecting an image on the card 10. It is desirable to provide such a configuration that the projection apparatus 300 is capable of projecting an image on any position in the card placement area 2. As will be described later, the projection apparatus 300 can be a projector for projecting image light on the card placement area 2. As an alternative, the projection apparatus 300 can also be a display apparatus for displaying an image in the card placement area 2 demarcated by the display apparatus itself. FIG. 1 shows a configuration in which the projection apparatus 300 is positioned above the card placement area 2. However, it is possible to place the projection apparatus 300 below the card placement area 2 or the projection apparatus 300 may also form its own card placement area 2.

A processing apparatus 100 acquires position coordinates, at which the card 10 is placed, by making use of a detection result produced by the card detecting sensor 200. Then, the processing apparatus 100 controls image projection carried out by the projection apparatus 300 in accordance with the acquired position coordinates. The processing apparatus 100 is a computer having functions to receive a detection result for a marker from the card detecting sensor 200 and reflect the detection result in the control of the image projection carried out by the projection apparatus 300. FIG. 1 shows a state in which the card detecting sensor 200 detects a marker added to the card 10 inside the card placement area 2 whereas the processing apparatus 100 drives the projection apparatus 300 to project a rendering image 3 output by the projection apparatus 300 on the card 10 whose position coordinates have been identified.

The card 10 has a plate shape having a front surface and a rear surface. The card 10 has a marker for identifying the card 10 on the front surface, the rear surface or both the surfaces. In the case of the card 10 having markers on both the front surface and the rear surface, the markers can be the same one or different ones. In the case of the card 10 having different markers on the front surface and the rear surface, each of the markers is configured to include information for identifying the card and information indicating whether the marker is a marker added to the front surface or the rear surface.

After the processing apparatus 100 identifies the card 10 on the basis of a detection result produced by the card detecting sensor 200, the processing apparatus 100 controls the projection apparatus 300 to project a rendering image 3 associated with the card 10 on the card 10. In the case of the card 10 having markers on both the front surface and the rear surface, the markers can be made different from each other. In this case, the rendering image 3 which is to be projected when the marker of the front surface is detected can be made different by the processing apparatus 100 from the rendering image 3 which is to be projected when the marker of the rear surface is detected.

Figure 2:
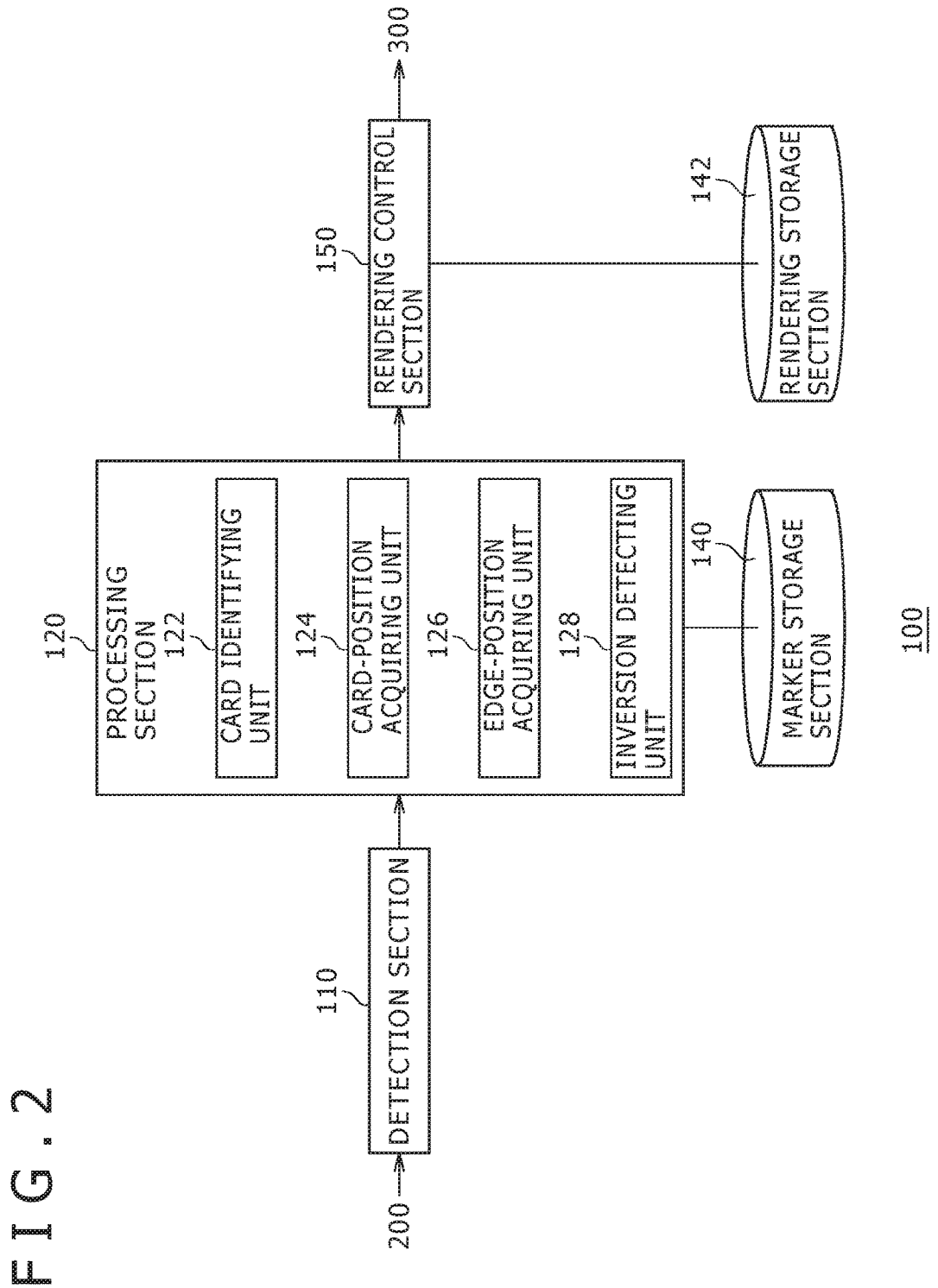
FIG. 2 is a diagram showing functional blocks of a processing apparatus.

FIG. 2 is a diagram showing functional blocks of the processing apparatus 100. As shown in the figure, the processing apparatus 100 includes a detection section 110, a processing section 120, a marker storage section 140, a rendering storage section 142 and a rendering control section 150. The detection section 110 has a function to detect a marker added to the card 10. The processing section 120 is configured to include a card identifying unit 122, a card-position acquiring unit 124, an edge-position acquiring unit 126 and an inversion detecting unit 128. On the basis of a detected marker, the processing section 120 acquires, among others, information on the card 10 having the marker and obtains the state of the card 10. On the basis of information received from the processing section 120, the rendering control section 150 controls an operation to render an image to the card 10. To put it concretely, the rendering control section 150 drives the projection apparatus 300 to project a rendering image on the card 10.

The processing function of the processing apparatus 100 according to this embodiment is carried out by making use of, among others, a central processing unit (CPU), a memory and a program loaded into the memory. The following description explains a configuration implemented by collaborations among the CPU, the memory and the program. Thus, a person skilled in the art understands that it is possible to realize the functional blocks in a variety of forms such as a hardware-only form, a software-only form and a hybrid form of combining hardware and software.

The marker storage section 140 is used for storing each marker and information for identifying the card 10 having the marker by associating the marker with the information. In the following description, the information for identifying the card 10 is referred to as a card ID. The rendering storage section 142 is used for storing each card ID and a rendering substance for the card 10 by associating the card ID with the rendering substance. The rendering substance of the card 10 can be a static or moving image to be projected on the card 10. It is to be noted that, if the function of the rendering control section 150 is implemented by a game program, the rendering storage section 142 can be used for storing the program expressing the rendering substance according to the execution progress of the game. In this case, the rendering storage section 142 can be realized by a recording medium for storing the game program. A read-only memory (ROM) is an example of the recording medium.

The following description explains a typical concrete example of a combination of the card 10, the card detecting sensor 200 and the projection apparatus 300.

Figure 3A:
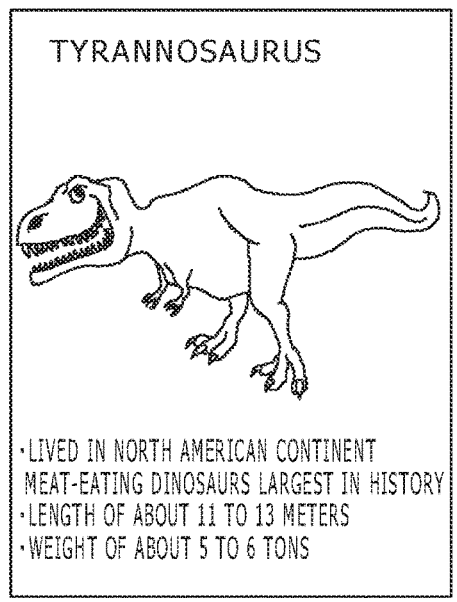
FIGS. 3A and 3B are diagrams each showing a typical card.
Figure 3B:
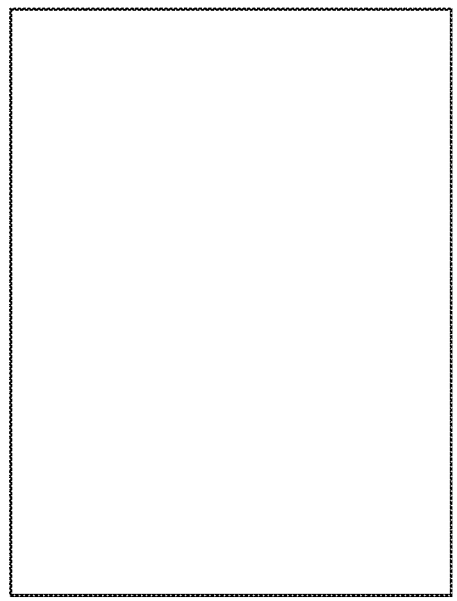

FIGS. 3A and 3B are diagrams each showing a typical card 10a. To be more specific, FIG. 3A shows the front surface of the card 10a whereas FIG. 3B shows the rear surface of the card 10a. On the front surface of the card 10a, a picture of a character and alphanumeric characters explaining the character picture are added in a form that can be recognized by the user. When the user looks at the alphanumeric characters and the character picture which have been printed on the front surface of the card 10a, the user can recognize the type of the card 10a. In the example shown in FIG. 3A, an art of the character which is a tyrannosaurus and a sentence explaining the character have been printed on the front surface of the card 10a.

On the rear surface of the card 10a, alphanumeric characters and a picture of a character which can be visually recognized by the user are not printed. This is because, as will be described later, a projector projects an image on the rear surface of the card 10a. Thus, the rear surface of the card 10a is provided entirely with one bright color so that the user can visually recognize reflected radiation light originating from the projector. By providing the rear surface of the card 10a with one color uniform color, the rear surface is capable of uniformly reflecting radiation light from the projector. It is desirable to provide the rear surface of the card 10a with a color which does not give disturbances to the user when the user is looking at an image projected on the rear surface of the card 10a. That is to say, it is desirable to provide the rear surface of the card 10a with a color which allows the user to visually recognize a projected image with ease. Ideally, it is desirable to provide the rear surface of the card 10a with a white color which effectively reflects a projected image from the projector.

As described above, on the rear surface of the card 10a, alphanumeric characters and a picture of a character which can be visually recognized by the user are not printed. It is to be noted, however, that a marker which can be detected by an invisible-light sensor such as an infrared-light sensor may be added to the rear surface. Note that it is desirable to add a marker by printing an invisible-light reflecting material or an invisible-light absorbing material. A typical example of the invisible-light reflecting material or the invisible-light absorbing material is a coating material which can be detected by an invisible-light sensor with a high degree of precision. Depending on the invisible-light reflecting material or the invisible-light absorbing material, however, the user can visually recognize the marker vaguely as a result. Just to make sure, the following remark is made. Even in this case, a marker is not added to the rear surface in order to cause the user to proactively recognize the card. Instead, a marker is by all means added only to be detected by an invisible-light sensor.

A marker added to the card 10a is used for recognizing the card 10a. The marker can be a two-dimensional code or a one-dimensional code. A bar code is a typical example of a one-dimensional code. On the other hand, a typical example of a two-dimensional code is a QR code which is a trademark. However, the card 10a can have a marker implemented by any code as long as the code can be used to recognize the card 10a uniquely. In the example shown in FIG. 3A, the marker can be an art of a tyrannosaurus.

Figure 4:
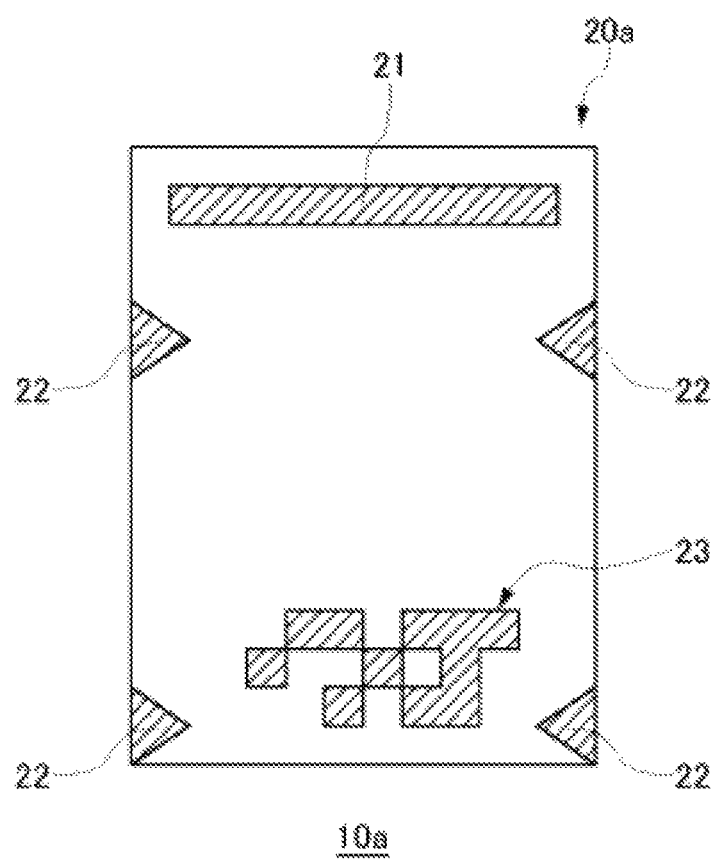
FIG. 4 is a diagram showing a typical marker added to the rear surface of the card.

FIG. 4 is a diagram showing a typical marker 20a added to the rear surface of the card 10a. This marker 20a is configured from typically a two-dimensional code disclosed in patent document 1. To be more specific, the marker 20a includes a reference cell 21 having a shape determined in advance, a plurality of rectangular cells 23 placed two dimensionally to construct code data and a plurality of triangular corner cells 22 placed to surround the rectangular cells 23. In the marker 20a, the relation between the positions of the reference cell 21 and the corner cells 22 is fixed. The type of the card 10a can be identified from the layout of the rectangular cells 23. The marker 20a including the reference cell 21, the corner cells 22 and the rectangular cells 23 is created by printing an infrared-light reflecting material or an infrared-light absorbing material on the rear surface of the card 10a. The infrared-light reflecting material reflects infrared light, which is radiated from an infrared-light source, at a high reflection rate in comparison with locations with no marker 20a printed on the rear surface of the card 10a. By the same token, the infrared-light absorbing material absorbs infrared light, which is radiated from an infrared-light source, at a high absorption rate in comparison with locations with no marker 20a printed on the rear surface of the card 10a. Thus, from light reflected by the rear surface of the card 10a, an infrared-light sensor receiving the light reflected by the rear surface of the card 10a is capable of detecting the marker 20a. For example, assume that the marker 20a is created by printing an infrared-light absorbing material on the rear surface of the card 10a. In this case, infrared light is absorbed by the marker 20a so that the infrared-light sensor detects the marker 20a as black areas. It is to be noted that, as already described above, the rear surface of the card 10a is uniformly coated with a one-color visible-light material. Thus, the rear surface of the card 10a is recognized as a surface coated with one color.

Figure 5:
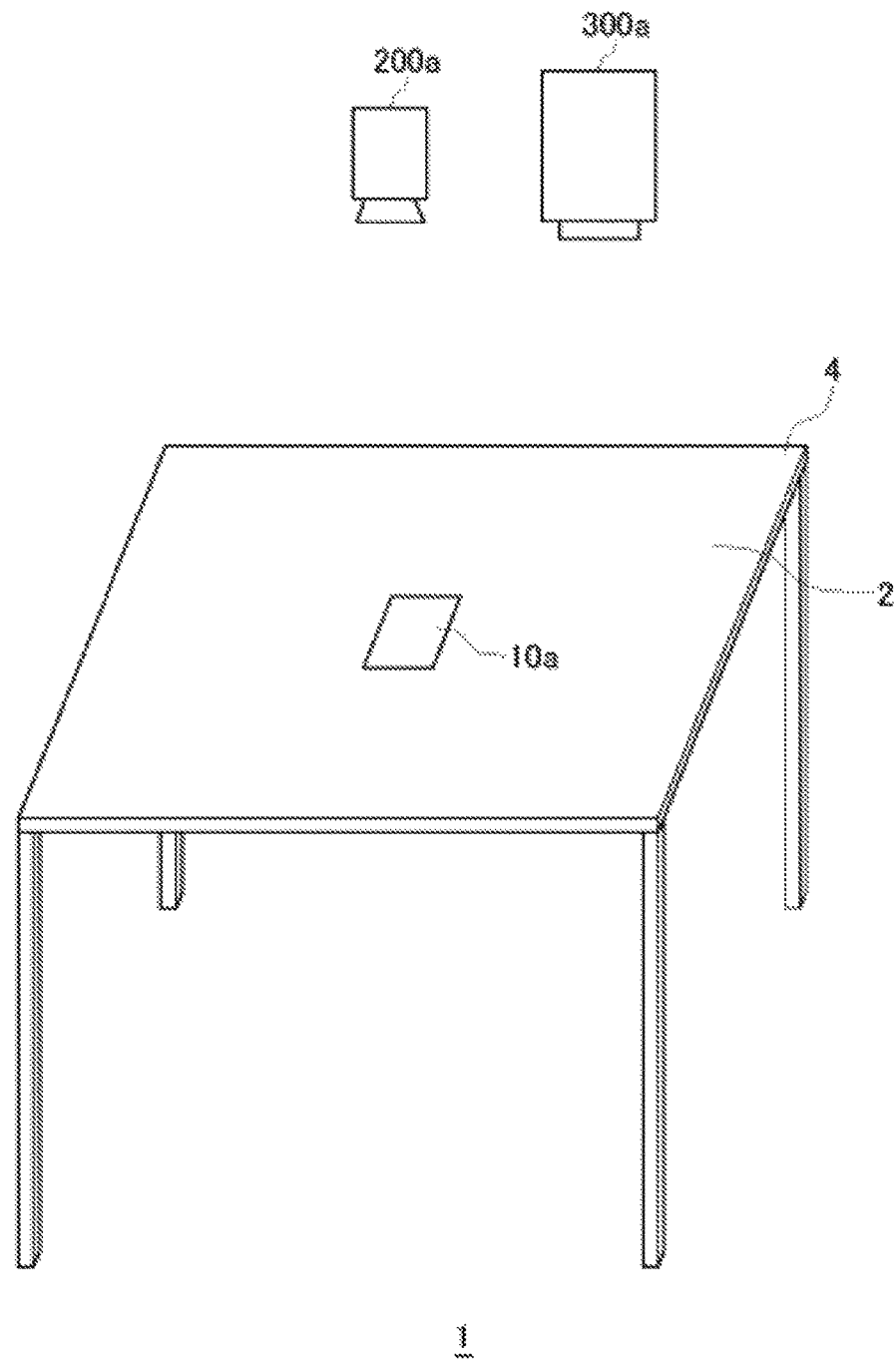
FIG. 5 is a diagram showing a typical combination of the card, a card detecting sensor and a projection apparatus.

FIG. 5 is a diagram showing a typical combination of the card 10, the card detecting sensor 200 and the projection apparatus 300. It is to be noted that the processing apparatus 100 is not shown in FIG. 5. In this configuration, a card 10a is placed on a table 4 and the entire upper surface of the table 4 serves as the card placement area 2. The card detecting sensor 200 is placed above the card placement area 2 and detects the card 10a placed in the card placement area 2. The projection apparatus 300 is also placed above the card placement area 2 and projects a rendering image on the card 10a. It is to be noted that, on the front surface of the card 10a, a visually recognizable art of a character has been printed and the card 10a is placed on the table 4 by exposing the front surface of the card 10a to the upper surface of the table 4, that is, by exposing the front surface of the card 10a to the card placement area 2. Thus, the card 10a is placed on the table 4 with the rear surface thereof facing upward. As described earlier, the rear surface of the card 10a is a surface on which a visually unrecognizable marker 20a has been printed. In this configuration, the card detecting sensor 200 is an infrared-light sensor embedded in an infrared-light camera 200a whereas the projection apparatus 300 is a projector 300a for projecting image light on the card 10a.

Image projection processing carried out on the card 10a is explained by referring back to FIG. 2 as follows.

The infrared-light camera 200a and the projector 300a are placed above the card placement area 2. A light source radiates infrared light to the card placement area 2 on which the card 10a including the marker 20a is placed. An infrared light sensor employed in the infrared-light camera 200a detects the infrared light reflected by the card 10a. The detection section 110 employed in the processing apparatus 100 acquires a detection result produced by the infrared light sensor in order to detect a marker 20a. Since the marker 20a is printed with an infrared-light reflecting material or an infrared-light absorbing material as explained earlier, the infrared light sensor is capable of well detecting the marker 20a.

Figure 6:
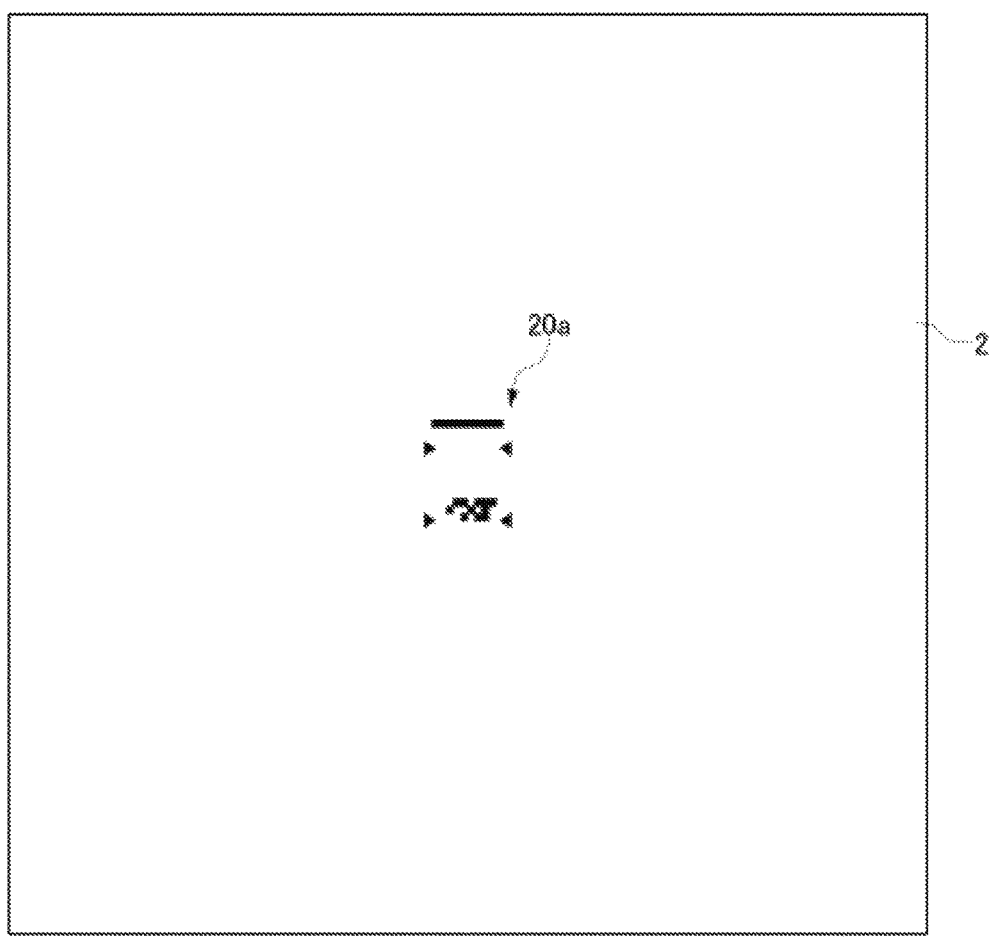
FIG. 6 is a diagram showing a typical detection result produced by an infrared-light sensor.

FIG. 6 is a diagram showing a typical detection result produced by the infrared light sensor. As described above, the infrared-light camera 200a acquires the detection result which is an infrared-light reflection image and supplies the image to the detection section 110. It is to be noted that the infrared-light camera 200a periodically acquires an infrared-light reflection image. For example, the infrared-light camera 200a may acquire one infrared-light reflected image every ¹⁄₆₀ seconds and supply the image to the detection section 110. The following description explains an algorithm to detect an infrared-light reflection image which is a marker 20a shown in FIG. 6.

The detection section 110 detects a reference cell 21 extending along a straight line on the infrared-light reflection image and verifies the existence of triangular corner cells 22 on lines which pass through the edges of the reference cell 21 in a direction perpendicular to the reference cell 21. Two of the corner cells 22 exist on one of the lines passing through the edges of the reference cell 21 in a direction perpendicular to the reference cell 21 whereas the other two of the corner cells 22 exist on the other one of the lines passing through the edges of the reference cell 21 in a direction perpendicular to the reference cell 21. After the detection section 110 verifies the existence of the four corner cells 22, the detection section 110 extracts a plurality of rectangular cells 23 from an area surrounded by the four corner cells 22. By execution of the algorithm described above, the marker 20a of the card 10a can be detected. The detection section 110 informs the processing section 120 of the detection result of the card 10a. The detection result includes at least the array of the rectangular cells 23 extracted from the marker 20a and the position coordinates of the marker 20a in the card placement area 2. In FIG. 2, the detection section 110 and the processing section 120 are shown as different functional blocks. It is to be noted, however, that the function of the detection section 110 can also be embedded in the processing section 120. In addition, instead of being embedded in the processing section 120, the function of the detection section 110 can also be embedded in the card detecting sensor 200.

The marker storage section 140 is used for storing all markers 20a prepared for card games and card IDs by associating each of the markers 20a with one of the card IDs which are each information for identifying a marker 20a. If the marker 20a is the two-dimensional code shown in FIG. 4, the marker storage section 140 can be used for storing an array of the rectangular cells 23 in each marker 20a and the card ID of the marker 20a by associating the array with the card ID.

The processing section 120 makes use of the detection result produced by the detection section 110 to carry out various kinds of processing. First of all, the card identifying unit 122 compares the array of the rectangular cells 23 detected by the detection section 110 with arrays each stored in the marker storage section 140 as an array of rectangular cells 23 in order to identify the card ID of a matching array. If the marker storage section 140 is used for holding the marker 20a as image information, the card identifying unit 122 carries out pattern matching processing on the image of the detected marker 20a and the image information held in the marker storage section 140 in order to identify image information matching the image of the detected marker 20a and identify the card ID associated with the marker 20a. In the pattern matching processing, the array image of the detected rectangular cells 23 can also be compared with the array image of the rectangular cells 23 stored in the marker storage section 140. It is to be noted that, if the marker storage section 140 is used for holding a bit pattern of each rectangular cell 23, the card identifying unit 122 compares the bit pattern of the detected rectangular cell 23 with the bit pattern of every rectangular cell 23 held in the marker storage section 140 in order to determine a stored bit pattern matching the bit pattern of the detected rectangular cell 23 and identify the card ID associated with the marker 20a. The card identifying unit 122 supplies the identified card ID to the card-position acquiring unit 124 and the edge-position acquiring unit 126.

The card-position acquiring unit 124 acquires position coordinates of the card 10a in the card placement area 2 from position coordinates of the marker 20a detected by the detection section 110. If the card 10a has a rectangular shape, the acquired position coordinates can be the coordinates of the four corners of the card 10a in the card placement area 2. It is to be noted that the card-position acquiring unit 124 also acquires the posture of the card 10a in the card placement area 2. That is to say, the card-position acquiring unit 124 also acquires angle information showing a gradient of the card placement area 2 in a two-dimensional coordinate system. This angle information is expressed as the gradient of a direction from the lower side of the card 10a to the upper side of the card 10a. Thus, depending on the orientation of the card 10a, a positive or negative value may be set in the angle information.

It is to be noted that, in the image projection system 1 making use of the card 10a, the real-world coordinate system in the card placement area 2, a camera coordinate system in the infrared-light camera 200a and a projector coordinate system in the projector 300a each exist independently of each other. The processing section 120 is provided with a coordinate adjustment function for automatically adjusting these coordinate systems. This function is executed in the processing section 120 to handle the position coordinates of a marker 20a detected by the infrared-light camera 200a by transforming the coordinates into by position coordinates in the card placement area 2. In addition, the function is executed in the processing section 120 to transform position coordinates in the card placement area 2 into position coordinates of the projector coordinate system in the projector 300a and supply the position coordinates of the projector coordinate system to the projector 300a. In the following description, as a prerequisite, the processing section 120 is assumed to have the coordinate adjustment function. For the sake of convenience in explanation of position coordinates, a variety of position coordinates are explained by treating the position coordinates as the same ones as the position coordinates of a two-dimensional coordinate system in the card placement area 2.

The card-position acquiring unit 124 has been holding positional relations between the reference cell 21 and the corner cells 22 in the card 10a. Thus, when the detection section 110 detects the marker 20a, the card-position acquiring unit 124 is capable of acquiring the four-corner coordinates of the card 10a and the angle information in the two-dimensional coordinate system from the position coordinates of the reference cell 21 and the corner cells 22 in the marker 20a.

The above description explains a case in which the marker 20a is the two-dimensional codes shown in FIG. 4. However, the above description also holds true of, for example, a case in which the marker 20a is a picture printed on the entire rear surface of the card 10a. It is to be noted that this picture is a picture drawn by making use of an infrared-light reflecting material or an infrared-light absorbing material and each of these materials cannot be visually recognized by the user or each of these materials is hard for the user to visually recognize. In this case, when the detection section 110 detects the marker 20a, the card-position acquiring unit 124 is capable of acquiring the four-corner coordinates and the angle information in the two-dimensional coordinate system of the card 10a by identifying the contours of the picture.

The card-position acquiring unit 124 supplies the four-corner coordinates and the angle information of the card 10a to the rendering control section 150 along with a card ID. It is to be noted that, as the position coordinates of the card 10a, the card-position acquiring unit 124 may also compute the coordinates of the center gravity of the card 10a and supply the coordinates of the center of gravity for the card 10a and the angle information to the rendering control section 150 along with a card ID.

The edge-position acquiring unit 126 acquires the edge-position coordinates of the card 10a. If the card 10a has a rectangular form, the edge-position acquiring unit 126 is capable of acquiring the position coordinates of the outer edges of the card 10a from the four-corner coordinates acquired by the card-position acquiring unit 124. In this case, the edge-position acquiring unit 126 acquires the position coordinates of the outer edges of the card 10a by identifying lines each connecting two adjacent corners at the corner coordinates to each other.

It is to be noted that the card 10a does not have to be a rectangular shape. That is to say, the card 10a may also be circular for example. In the case of the card 10a of circular shape, the radius of the card 10a of circular shape is held in advance by the card-position acquiring unit 124. In this case, the marker 20a is configured to include at least a predetermined portion printed at the center of the rear surface of the card 10a of circular shape and typically two-dimensional codes placed at locations surrounding the printed portion. Thus, the card-position acquiring unit 124 acquires the position coordinates of the predetermined portion printed at the center of the rear surface of the card 10a as the position coordinates of the center, supplying the position coordinates of the center of the rear surface of the card 10a and the radius of the card 10a to the edge-position acquiring unit 126. Accordingly, the edge-position acquiring unit 126 is capable of acquiring the position coordinates of the outer edge of the card 10a. It is to be noted that the radius of the card 10a may also be stored in the edge-position acquiring unit 126 in advance.

As described above, the edge-position acquiring unit 126 has a function to identify the outer edge of the card 10a placed in the card placement area 2. As will be described later, the outer edge of the card 10a serves as a reference during projection carried out by the projector 300a to project image light. Thus, the edge-position acquiring unit 126 supplies the position coordinates of the outer edge of the card 10a and the card ID to the rendering control section 150. It is to be noted that the function of the edge-position acquiring unit 126 can also be embedded in the card-position acquiring unit 124. In such a configuration, the card-position acquiring unit 124 supplies the position coordinates of the outer edge of the card 10a and the card ID to the rendering control section 150. In addition, the function of the card-position acquiring unit 124 can also be embedded in the rendering control section 150.

While the game is being carried forward, the user may move the card 10a placed in the card placement area 2 in some cases. For such cases, the processing section 120 is provided with a function to carry out locus processing on the card 10a which has been once detected. In addition, the card-position acquiring unit 124 acquires the position coordinates of the card 10a and the angle information for every taken image. On top of that, the edge-position acquiring unit 126 acquires the position coordinates of the card 10a for every taken image.

A rendering control section 150 is typically a game engine. The rendering control section 150 controls rendering carried out on the card 10a in accordance with the card ID supplied thereto by the processing section 120. A rendering storage section 142 is used for storing card IDs and rendering patterns by associating each of the card IDs with one of the rendering patterns. The rendering pattern can be a static image or a moving image. As described earlier, the rendering pattern can be configured by making use of a game program or the like. In either case, the rendering storage section 142 is configured to serve as a memory used for storing card IDs and rendering patterns by associating each of the card IDs with one of the rendering patterns.

The rendering control section 150 controls image projection, which is carried out by the projector 300a, in accordance with a rendering pattern stored in the rendering storage section 142. To put it concretely, the rendering control section 150 reads out a rendering image associated with the card ID supplied by the processing section 120 from the rendering storage section 142 or generates a rendering image in accordance with a rendering pattern read out from the rendering storage section 142. Then, on the basis of information on a position at which the card 10a has been placed, the rendering control section 150 drives the projector 300a to project the rendering image on the card 10a. To put it more concretely, the rendering control section 150 drives the projector 300a to project the rendering image associated with the card 10a on the card 10a on the basis of the edge position coordinates of the card 10a. Thus, the user is capable of visually recognizing the rendering image projected on the card 10a and enjoys the rendering of the game.

Figure 7:
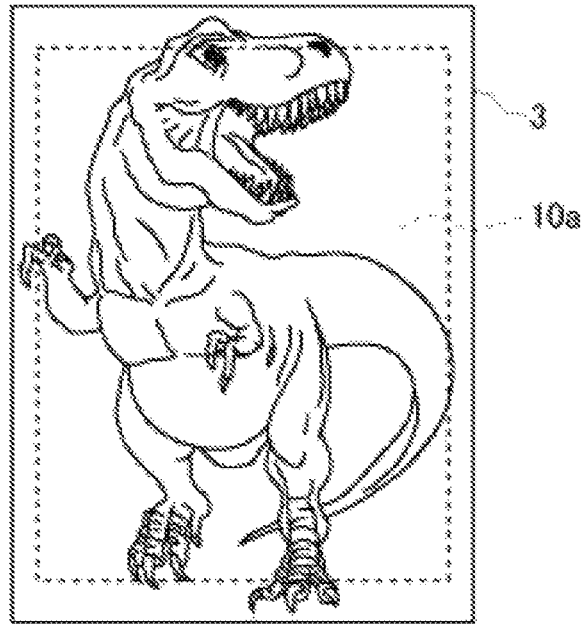
FIG. 7 is a diagram showing a typical rendering image projected on the card.

FIG. 7 is a diagram showing a typical rendering image projected on the card 10a. The card 10a is placed on the card placement area 2 with the rear surface of the card 10a serving as the upper surface of the card 10a. The projector 300a projects a rendering image 3 on the card 10a. As described before, the image projection carried out by the projector 300a is controlled by the rendering control section 150. The rendering control section 150 generates a rendering image to be projected on the card 10a and drives the projector 300a to radiate the rendering image to the card 10a. The rear surface of the card 10a displays a very bright color so that light radiated from the projector 300a is well reflected by the rear surface of the card 10a. As a result, the user can visually recognize the clear rendering image 3.

On the basis of edge position coordinates received from the edge-position acquiring unit 126 as the edge position coordinates of the card 10a, the rendering control section 150 drives the projector 300a to project the rendering image 3 on the entire rear surface of the card 10a. At that time, as shown in FIG. 7, it is desirable that the rendering control section 150 drives the projector 300a to project the rendering image 3 at a size larger than the card 10a by superposing the rendering image 3 on the card 10a. That is to say, the projector 300a projects the rendering image 3 by expanding the rendering image 3 to locations beyond the outer edges of the card 10a. The projector 300a radiates a game image including the rendering image 3 to the entire card placement area 2. Since the card 10a has some thickness, however, a portion of the card 10a may include parts not receiving the rendering image 3. In such a case, the user may visually recognize an edge of the card 10a at the parts. If the rendering image 3 can be projected at the same size as that of the card 10a and projected to just match the edges of the card 10a, the edges of the card 10a are not striking. If the rendering image 3 is shifted from the card 10a by even a small distance, however, some particular edges of the card 10a may be striking in some cases. The particular edges are edges not overlapping the rendering image 3. Thus, in order to solve this problem, the rendering image 3 is projected in advance at a size larger than that of the card 10a. In this way, even if the rendering image 3 is shifted to a certain degree from the location to which the rendering image 3 is to be radiated, as before, it is possible to sustain a state in which the rendering image 3 is projected on the entire rear surface of the card 10a. Thus, it is possible to prevent the edges of the card 10a from becoming striking.

The rendering control section 150 may cause game-related information, such as the rules of the game or the manner in which to handle the card 10a, to be projected in the vicinity of the card 10a. The rendering control section 150 may set a background image associated with the card 10a and cause the projector 300a to project that background image onto the card placement area 2. The rendering control section 150 may further set the background image in a manner associated with an identified card ID or a combination of identified card IDs.

Figure 8A:
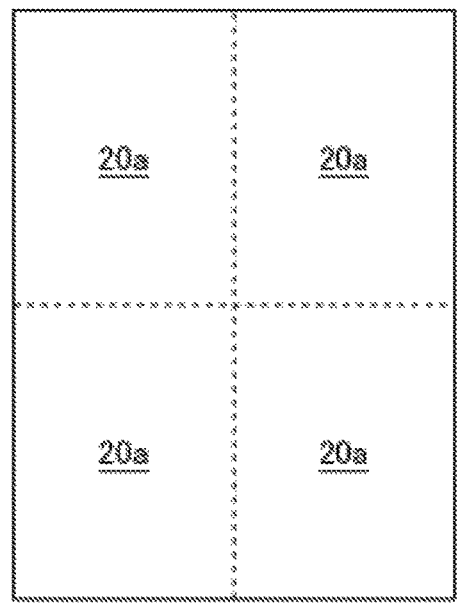
FIGS. 8A and 8B are diagrams each showing other typical markers.

FIG. 8A is a diagram showing another typical marker provided on the rear surface of the card 10a. As shown in the figure, the rear surface of the card 10a is divided into two portions separated away from each other in the vertical direction and each of the portions is divided into two sub-portions separated away from each other in the horizontal direction. That is to say, the rear surface of the card 10a is divided into four sub-portions which are each referred to as a marker area. The four marker areas have the same marker 20a. In addition, the markers 20a have the same orientation.

Figure 8B:
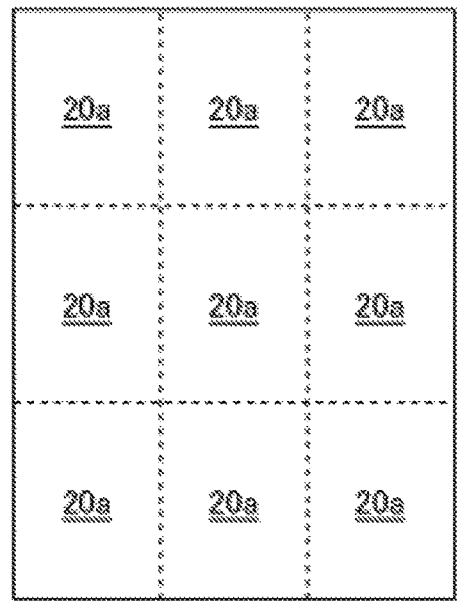

FIG. 8B is a diagram showing another typical marker provided on the rear surface of the card 10a. As shown in the figure, the rear surface of the card 10a is divided into three portions separated away from each other in the vertical direction and each of the portions is divided into three sub-portions separated away from each other in the horizontal direction. That is to say, the rear surface of the card 10a is divided into nine sub-portions which are each referred to as a marker area. The nine marker areas have the same marker 20a. In addition, the markers 20a have the same orientation.

In the card placement area 2, while a game is being played, the card 10a may be moved by a finger of the user. Thus, while the card 10a is being moved, the finger of the user is overlapping a portion of the rear surface of the card 10a. Accordingly, as shown in FIGS. 8A and 8B, the same marker 20a is added to a different area of the rear surface of the card 10a in the same orientation. Therefore, even in a state in which the finger is overlapping a portion of the rear surface of the card 10a, in an area in which the finger is not overlapping, at least one marker 20a can be detected by the infrared-light camera 200a. Note that it is impossible to predict which portion of the rear surface of the card 10a will be touched by the user. Thus, for example, a number of markers 20a can be placed on the rear surface of the card 10a as shown in FIG. 8B in order to increase the precision of an operation carried out by the infrared-light camera 200a to detect the marker 20a.

It is to be noted that, as described earlier, the rendering control section 150 drives the projector 300a to project the rendering image 3 associated with the card 10a on the card 10a. However, it is also possible to provide a typical configuration in which the rendering control section 150 drives the projector 300a to project the rendering image 3 on the card 10a in accordance with the movement of the card 10a. The rendering control section 150 may also find the velocity of the card 10a and the forward movement direction of the card 10a from changes of the position coordinates of the card 10a. Then, the rendering control section 150 may also drive the projector 300a to radiate the rendering image 3 associated with the found velocity and the found forward movement direction to the card 10a. In addition, it is also possible to provide a typical configuration in which, when the infrared-light camera 200a detects a finger of the user, the rendering control section 150 drives the projector 300a to radiate the rendering image 3 according to the detected finger. For example, the rendering image 3 may be the video of a moving tyrannosaurus like one shown in FIG. 7. As an alternative, if there is an opponent user in a fight game, the rendering image 3 can be a video of some actions against a rendering image of the card 10a of the opponent user. Each of the rendering images 3 is properly determined in accordance with the game and, by carrying out such a rendering operation, the degree of amusingness of the game can be raised.

It is to be noted that, when the rendering control section 150 no longer receives information on the detected card 10a from the processing section 120, the rendering image 3 is sustained in the last state in which the information has been received. For example, when the entire rear surface of the card 10a is inadvertently covered by fingers or when the image taking operation making use of the infrared-light camera 200a is not well carried out, the detection section 110 does not detect a marker 20a so that the rendering control section 150 does not receive information on the detected card 10a from the processing section 120. At that time, the rendering control section 150 may also drive the projector 300a to project the rendering image 3 by setting the rendering image 3 at a grey scale or raise the transmission factor of the rendering image 3 in order to carry out projection in a state different from the normal state. In this way, the user can be made aware of the fact that the card 10a has not been properly detected by the infrared-light camera 200a.

As explained before, FIG. 3A shows a typical front surface of the card 10a whereas FIG. 3B shows a typical rear surface of the card 10a and a marker whose image can be taken by making use of an infrared-light camera has been added to the rear surface. It is to be noted, however, that in a modified typical example, a marker whose image can be taken by making use of an infrared-light camera can also be added to the front surface. It is to be noted that, in this case, a picture which can be visually recognized by the user is added to the front surface of the card 10a and it is desirable to print the picture in a bright color. That is to say, it is desirable to print the picture in a color which does not become a disturbance for the user to recognize a projected image when the image is projected by the projector 300a on the front surface of the card 10a.

In the following description, a marker added to the rear surface of the card 10a is denoted by reference numeral 20a whereas a marker added to the front surface of the card 10a is denoted by reference numeral 20b. Processing to detect the markers 20a and 20b is carried out by the detection section 110 and the processing section 120 in the same way as what has been described above. The marker storage section 140 is used for storing markers and card IDs each associated with one of the markers. If markers are added to both the front and rear surfaces of the card 10a, however, the marker storage section 140 is used for storing markers, card IDs and information indicating whether a marker is a marker added to the front or rear surface of the card 10a. In the marker storage section 140, the markers, the card IDs and the information are associated with each other. Thus, when the card identifying unit 122 receives a detection result from the detection section 110, by comparing a detected marker with markers stored in the marker storage section 140 in advance, the card identifying unit 122 is capable of identifying the card ID and determining whether the detected marker is a marker for the front or rear surface of the card 10a.

For example, the detection section 110 detects the marker 20a of the card 10a for a case in which the rear surface of the card 10a serves as the upper surface. In this state, let the card 10a be turned over into a state in which the rear surface of the card 10a serves as the lower surface whereas the front surface of the card 10a serves as the upper surface. In this new state, the detection section 110 detects the marker 20b of the card 10a. A transition from a state of detecting the marker 20a to a state of detecting no marker 20a is made. Later on, when the marker 20b is detected, the inversion detecting unit 128 detects upside-down inversion of the card 10a. It is to be noted that the inversion detecting unit 128 may also detect inversion of the card 10a under a condition that the interval between a time of detecting no marker 20a and a time of detecting the marker 20b is within a period determined in advance. When the inversion detecting unit 128 detects the inversion of the card 10a, the inversion detecting unit 128 notifies the rendering control section 150 of the inversion. After the marker 20a is no longer detected, the rendering control section 150 drives the projector 300a to project a rendering image 3 by setting the rendering image 3 at a grey scale or raise the transmission factor of the rendering image 3 in order to carry out projection in a state different from the normal state. Then, as the marker 20b is detected, a rendering operation determined in advance is carried out.

In this modified typical example, the rendering storage section 142 is used for storing card IDs, information on the card surface and rendering substances by associating the card IDs, the information on the card surface and the rendering substances with each other. Thus, while a marker 20a is being detected, the rendering control section 150 drives the projector 300a to radiate the rendering image 3 associated with the rear surface of the card 10a. While a marker 20b is being detected, on the other hand, the rendering control section 150 drives the projector 300a to radiate the rendering image 3 associated with the front surface of the card 10a. When the rendering storage section 142 receives an inversion detection result from the inversion detecting unit 128, instead of simply changing the rendering image from the rendering image associated with the rear surface of the card 10a to the rendering image associated with the front surface of the card 10a, it is desirable to drive the projector 300a to radiate a predetermined rendering image prior to the operation to switch the rendering image. For example, when the rendering storage section 142 receives an inversion detection result from the inversion detecting unit 128, the rendering control section 150 carries out a rendering operation to explode the rendering image 3 for the rear surface of the card 10a and, then, project the rendering image 3 for the front surface of the card 10a. By carrying out such a rendering operation, it is possible to cause the user to recognize the fact that an operation to turn over the card 10a has been detected properly.

Figure 9:
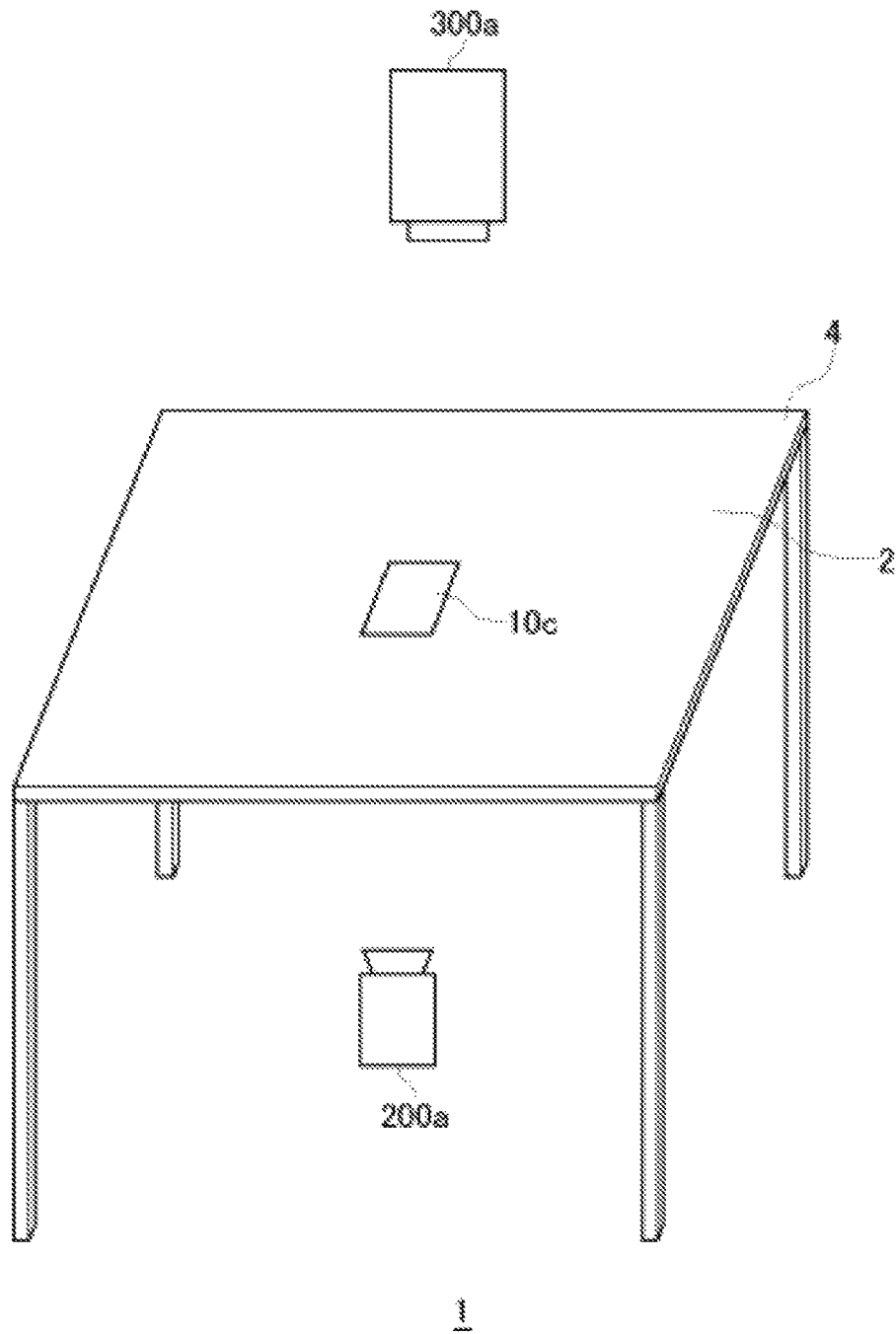
FIG. 9 is a diagram showing another typical combination of the card, the card detecting sensor and the projection apparatus.

FIG. 9 is a diagram showing another typical combination of the card 10, the card detecting sensor 200 and the projection apparatus 300. It is to be noted that FIG. 9 does not show the processing apparatus 100. In typical examples shown in FIG. 9 and subsequent figures, the processing apparatus 100 carries out the same processing functions as those explained so far. Thus, the explanation of the processing functions is properly omitted from the following description in order to avoid duplications of the explanation.

As visually recognized by the user, the card 10c shown in FIG. 9 has a front surface shown in FIG. 3A and a rear surface shown in FIG. 3B.

In the typical combination shown in FIG. 9, the top plate of the table 4 is made from a semi-transparent material such as acryl. The infrared-light camera 200a is placed beneath the top plate. That is to say, in the typical combination shown in FIG. 9, the infrared-light camera 200a detects the marker of a card 10c placed on the upper surface of the table 4 from a location below the table 4.

In the past, a technology called a DI (Diffused Illumination) technology has been known. This technology is a technology for detecting a multi-touch input. The typical combination shown in FIG. 9 adopts this technology. In accordance with this technology, when the infrared-light camera 200a radiates infrared light from a position beneath the table 4 to the top plate of the table 4, the infrared light passes through the front surface of the top plate. If the card 10c has been placed on the front surface of the top plate, the infrared light is reflected by the card 10c and observed by the infrared-light sensor. Thus, the infrared-light camera 200a is capable of detecting the marker added to the card 10c. In addition, by the same token, a technology called an FTIR (Frustrated Total Internal Reflection) technology has also been known. This technology is also a technology for detecting a multi-touch input. This technology requires that infrared light be radiated to the inside of an acryl plate. Since the card 10c reflects the infrared light to a position beneath the table 4, however, the infrared-light camera 200a is capable of detecting a marker added to the card 10c.

Thus, the rear surface of the card 10c serves as the projection plane of the projector 300a. Since the card 10c is placed on the table 4 and the rear surface of the card 10c is exposed to the projector 300a provided above the table 4, the marker is added to the front surface on which a picture of a character or the like has been printed. Thus, to the card observing eyes of the user, the card 10c is different from the card 10a shown in FIGS. 3A and 3B as follows. Even though the card 10c also has the front surface shown in FIG. 3A and the rear surface shown in FIG. 3B, the marker of the card 10c is added to the front surface in place of the rear surface. It is to be noted that, as described before, markers can also be added to both the front and rear surfaces.

Figure 10:
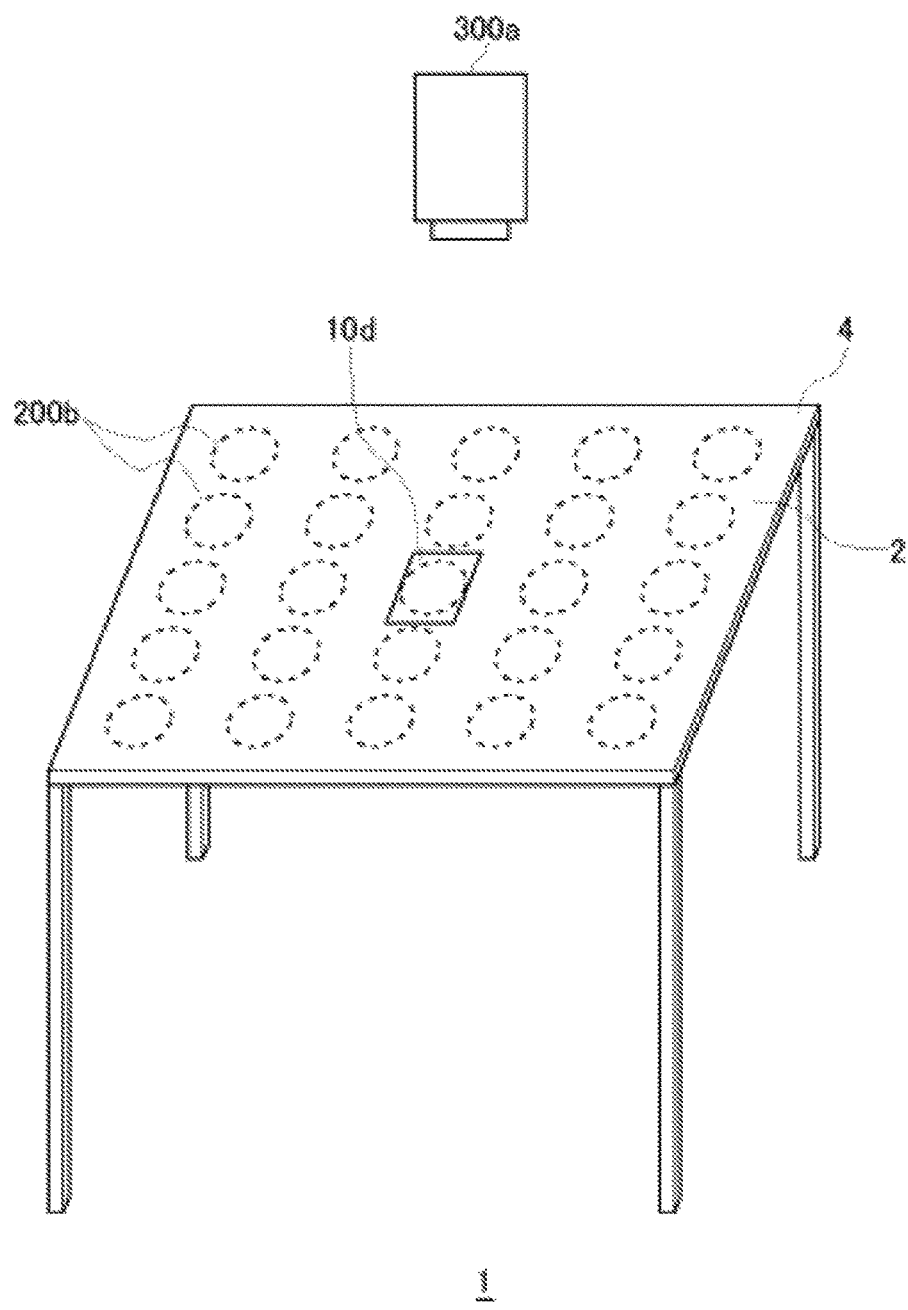
FIG. 10 is a diagram showing a further typical combination of the card, the card detecting sensor and the projection apparatus.

FIG. 10 is a diagram showing a further typical combination of the card 10, the card detecting sensor 200 and the projection apparatus 300. It is to be noted that FIG. 10 does not show the processing apparatus 100. As visually recognized by the user, a typical card 10d shown in FIG. 10 has a front surface shown in FIG. 3A and a rear surface shown in FIG. 3B. However, no markers are added to both the front and rear surfaces.

In the typical example shown in FIG. 10, a plurality of NFC (Near Field Communication) readers 200b are embedded in the table 4. The card 10d has a near field radio communication function and communicates its own card ID to the NFC readers 200b. In each of the NFC readers 200b, a reader ID is set. The card-position acquiring unit 124 employed in the processing apparatus 100 is used for storing the reader IDs and positions at which the NFC readers 200b are embedded in the card placement area 2 by associating each of the reader IDs with one of the positions. When the card ID is transferred from the card 10d to the NFC reader 200b, the NFC reader 200b informs the detection section 110 of the card ID and the reader ID of the NFC reader 200b. Thereby, the detection section 110 detects the existence of the card 10d, passing on the card ID and the reader ID to the processing section 120. Thus, the card identifying unit 122 identifies the card ID and, in addition, the card-position acquiring unit 124 acquires information on the position of the NFC reader 200b which has detected the card 10d. That is to say, the card-position acquiring unit 124 acquires information on the position of the card 10d in the card placement area 2. The card ID and the information on the position of the card 10d in the card placement area 2 are subsequently supplied to the rendering control section 150 which then drives the projector 300a to project the rendering image 3 associated with the card 10d on the card 10d.

Figure 11A:
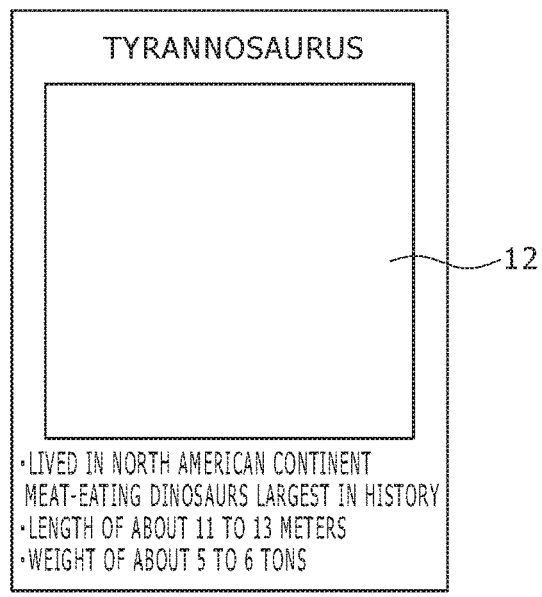
FIGS. 11A and 11B are diagrams each showing another typical card.
Figure 11B:
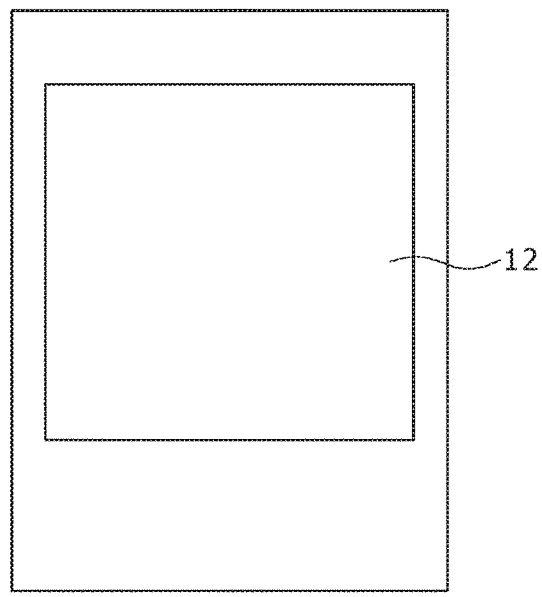

FIGS. 11A and 11B are diagrams each showing another typical card 10e. To be more specific, FIG. 11A shows the front surface of the card 10e whereas FIG. 11B shows the rear surface of the card 10e. On the front surface of the card 10e, a description of a character and the like have been printed. By looking at the description printed on the front surface of the card 10e, the user can identify the type of the card 10e. In the case of the typical card 10e shown in FIG. 11A, on the front surface of the card 10e, a description of a tyrannosaurus has been printed.

As shown in FIGS. 11A and 11B, on the card 10e, a transparent window 12 has been created. In the case of the card 10a shown in FIGS. 3A and 3B, the rendering image 3 is projected on the rear surface. In the case of the card 10e, on the other hand, the rendering image 3 is projected on the transparent window 12. As will be described later, for the card 10e placed in the card placement area 2, the rendering image 3 is projected and shown on the transparent window 12 in such a way that the user can visually recognize the rendering image 3. In the card 10e, the marker 20a like the one shown in FIG. 4 is added to the front or rear surface or both the surfaces. It is to be noted that the card 10e can be used as follows. The card 10e is placed in the card placement area 2 in such a way that the user can see the front surface, on which a description of a character has been printed, and the rendering image 3 is projected on the transparent window 12. It is to be noted that, since the rendering image 3 is projected on the transparent window 12, information on a character can also be printed in an area outside the transparent window 12 on the rear surface as shown in FIG. 11B for example.

Figure 12:
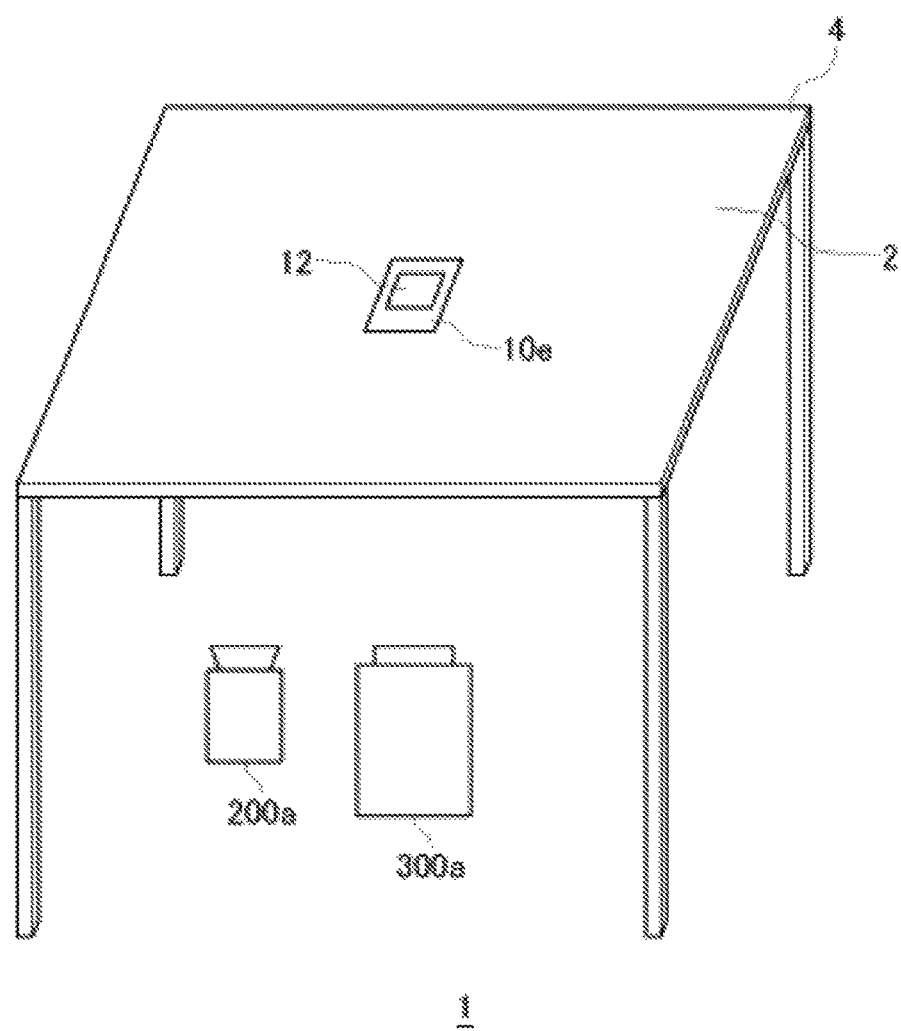
FIG. 12 is a diagram showing a still further typical combination of the card, the card detecting sensor and the projection apparatus.

FIG. 12 is a diagram showing a further typical combination of the card 10, the card detecting sensor 200 and the projection apparatus 300. It is to be noted that FIG. 12 does not show the processing apparatus 100.

In the typical combination shown in FIG. 12, the top plate of the table 4 is made from a semi-transparent material such as acryl. The infrared-light camera 200a and the projector 300a are placed beneath the top plate. That is to say, in the typical combination shown in FIG. 12, the infrared-light camera 200a detects the marker 20a of the card 10e placed on the upper surface of the table 4 from a location below the table 4. In addition, the projector 300a placed beneath the table 4 radiates image light to the transparent window 12 of the card 10e.

As explained earlier by referring to FIG. 9, the DI or FTIR technology is adopted. When the infrared-light camera 200a placed beneath the table 4 radiates infrared light to the top plate, the infrared light passes through the surface of the top plate. If the card 10e has been placed on the front surface of the top plate, the infrared light is reflected by the card 10e and observed by an infrared-light sensor. Thus, the infrared-light camera 200a is capable of detecting a marker 20a added to the card 10e.

The card 10e is placed in the card placement area 2 in such a way that the front surface of the card 10e faces upward. Thus, the marker 20a is added to at least the rear surface. The projector 300a placed below the card 10e radiates the rendering image 3 to the card 10e. Thus, the rendering image 3 is shown on the transparent window 12. It is to be noted that, with regard to the card 10e, the edge-position acquiring unit 126 is used for holding a positional relation between the four-corner coordinates of the card 10e and the transparent window 12. When the edge-position acquiring unit 126 receives positional and angular information of the card 10e from the card-position acquiring unit 124, the edge-position acquiring unit 126 acquires the edge positions of the transparent window 12 and supplies the positions (also referred to as the positions of a window frame) to the rendering control section 150. It is desirable that the rendering control section 150 drives the projector 300a to project the rendering image 3 within the range of the window frame and at a size smaller than the window frame on the card 10e.

That is to say, the projector 300a projects the rendering image 3 having a size smaller than the transparent window 12 of the card 10e on the card 10e. If the size of the rendering image 3 is the same as that of the transparent window 12 for example, there will be no problem provided that the projector 300a is capable of projecting the rendering image 3 by exactly adjusting the rendering image 3 to the edge of the transparent window 12. If the rendering image 3 is shifted from the edge of the transparent window 12 even a little bit, however, the rendering image 3 will undesirably protrude from the edge of the transparent window 12 so that a portion of the rendering image 3 may not be shown on the transparent window 12 in some cases. In order to solve this problem, the projector 300a projects the rendering image 3 at a size smaller than the transparent window 12 from the beginning. In this way, it is possible to sustain a state in which the entire rendering image 3 is shown on the transparent window 12 as before even if the rendering image 3 is shifted to a certain degree from the position to which the rendering image 3 is to be radiated.

It is to be noted that the above description is given by assuming operations in which a tyrannosaurus is fully projected in the rendering image 3 having a rectangular shape and shown on the entire window 12. By setting the tyrannosaurus to be projected at a size smaller to a certain degree than the transparent window 12 in advance, even if the rendering image 3 having a size larger than the transparent window 12 is projected, the tyrannosaurus can be projected inside the transparent window 12. In this case, by setting the rendering image 3 at a size larger than the transparent window 12 from the beginning, even if the rendering image 3 is shifted from a position to which the rendering image 3 is to be radiated, the boundary line of the rendering image 3 is not shown inside the frame of the transparent window 12. Meanwhile, since the image of the tyrannosaurus is made smaller than the transparent window 12, the image of the tyrannosaurus can be accommodated in the transparent window 12.

Figure 13:
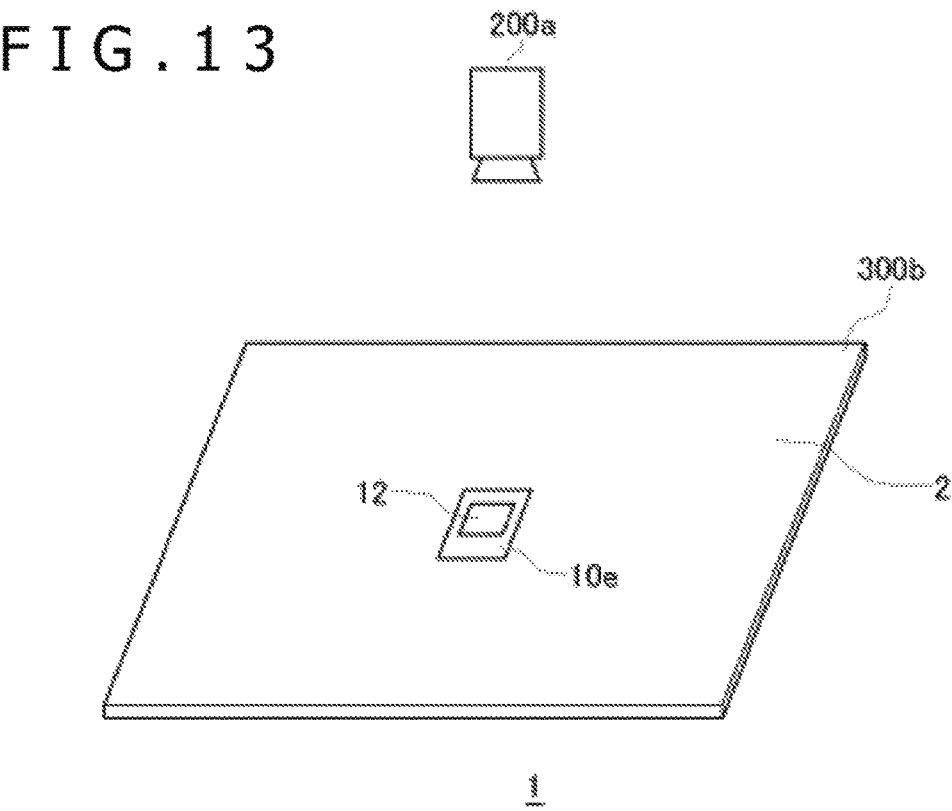
FIG. 13 is a diagram showing a still further typical combination of the card, the card detecting sensor and the projection apparatus.

FIG. 13 is a diagram showing a further typical combination of the card 10, the card detecting sensor 200 and the projection apparatus 300. It is to be noted that FIG. 13 does not show the processing apparatus 100.

In the typical configuration shown in FIG. 13, a display apparatus 300b such as a liquid-crystal panel is used as the projection apparatus 300. The display apparatus 300b projects the rendering image 3 on the transparent window 12 of the card 10e. The infrared-light camera 200a is placed above the display apparatus 300b and detects the marker 20a added to a surface of the card 10e. The rendering control section 150 executes display control on the display apparatus 300b to project the rendering image 3 smaller than the frame of the transparent window 12 on the card 10e, so that the rendering image 3 shown in the transparent window 12 can be visually recognized by the user well.

Figure 14:
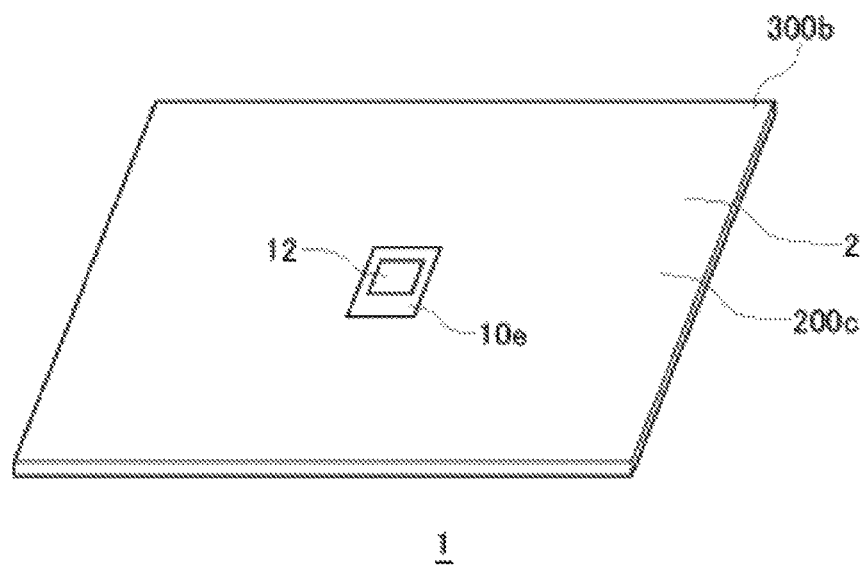
FIG. 14 is a diagram showing a still further typical combination of the card, the card detecting sensor and the projection apparatus.

FIG. 14 is a diagram showing a further typical combination of the card 10, the card detecting sensor 200 and the projection apparatus 300. It is to be noted that FIG. 14 does not show the processing apparatus 100.

In the typical configuration shown in FIG. 14, the display apparatus 300b such as a liquid-crystal panel is used as the projection apparatus 300. In addition, the display apparatus 300b shown in FIG. 14 includes an infrared-light sensor 200c embedded therein. Thus, the infrared-light sensor 200c detects the marker 20a added to the rear surface of the card 10e. The rendering control section 150 executes display control on the display apparatus 300b to project the rendering image 3 smaller than the frame of the transparent window 12 on the card 10e, so that the rendering image 3 shown in the transparent window 12 can be visually recognized by the user well.

Figure 15:
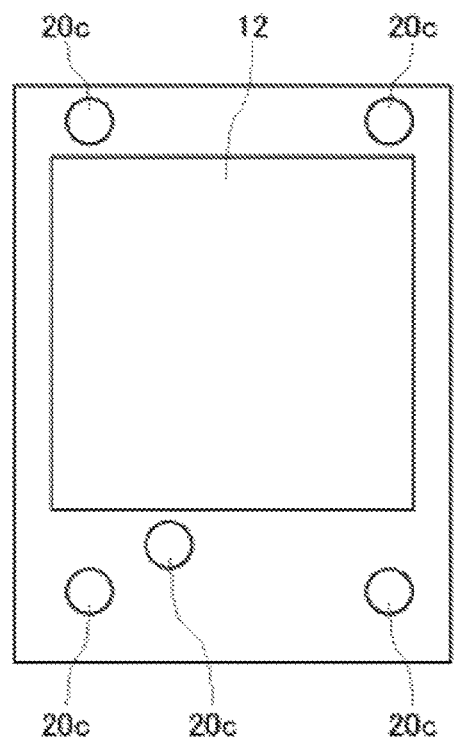
FIG. 15 is a diagram showing another typical card.

FIG. 15 is a diagram showing another typical card 10f. The card 10f has the transparent window 12 as is the case with the card 10e shown in FIGS. 11A and 11B. However, the card 10f has an electrostatic marker in place of an infrared-light marker. The electrostatic marker is configured to include a plurality of markers 20c. When the user touches any one of the markers 20c, a voltage is supplied to each of the markers 20c. The layout of the markers 20c on the card 10f is determined uniquely for every card type. Thus, the card identifying unit 122 is capable of identifying the type of the card 10f from the layout pattern of the markers 20c.

Figure 16:
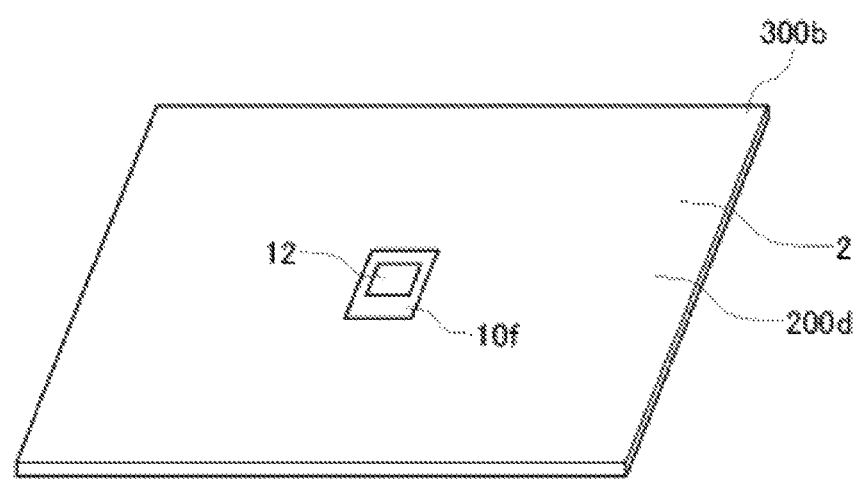
FIG. 16 is a diagram showing a still further typical combination of the card, the card detecting sensor and the projection apparatus.

FIG. 16 is a diagram showing a further typical combination of the card 10, the card detecting sensor 200 and the projection apparatus 300. It is to be noted that FIG. 16 does not show the processing apparatus 100.

In the typical configuration shown in FIG. 16, the display apparatus 300b such as a liquid-crystal panel is used as the projection apparatus 300. In addition, the display apparatus 300b shown in FIG. 16 includes an electrostatic touch sensor 200d embedded therein, being designed to serve as a display apparatus for a multi-touch configuration. Thus, when the user touches the marker 20c of the card 10f, the electrostatic touch sensor 200d detects the layout pattern of the markers 20c. The card identifying unit 122 is capable of identifying the card ID of the card 10f from the layout pattern of the markers 20c. In addition, the card-position acquiring unit 124 acquires the position coordinates of the card 10f and angle information whereas the edge-position acquiring unit 126 acquires the position coordinates of the transparent window 12 of the card 10f. The rendering control section 150 executes display control on the display apparatus 300b to project a rendering image 3 smaller than the frame of the transparent window 12 on the card 10f, so that the rendering image 3 shown in the transparent window 12 can be visually recognized by the user well.

The above description explains the present disclosure on the basis of embodiments. However, these embodiments are no more than typical implementations. That is to say, the embodiments can be modified in a variety of ways by changing the combination of the configuration elements and the combination of processing processes, and a person skilled in the art therefore understands that the modified embodiments are also included in the scope of the present disclosure.

For example, in the case of the typical card 10a shown in FIGS. 3A and 3B, an art of a character and a sentence explaining the character have printed on the front surface of the card 10a. As described above, the art of the character and the sentence explaining the character can be visually verified by the user. On the rear surface of the card 10a, on the other hand, an invisible-light reflecting material or an invisible-light absorbing material has been printed to express the marker of the card 10a. As described above, a picture that can be visually verified by the user or alphanumeric characters that can be visually verified by the user are not printed on the rear surface of the card 10a. For example, this embodiment can be modified to result in another embodiment implementing a card 10 described as follows. A picture that can be visually verified by the user or alphanumeric characters that can be visually verified by the user have been printed on both the surfaces of the card 10. In addition, on at least one of the surfaces of the card 10, an invisible-light reflecting material or an invisible-light absorbing material has been printed to express the marker of the card 10. The other embodiment is explained as follows.

Figure 17A:
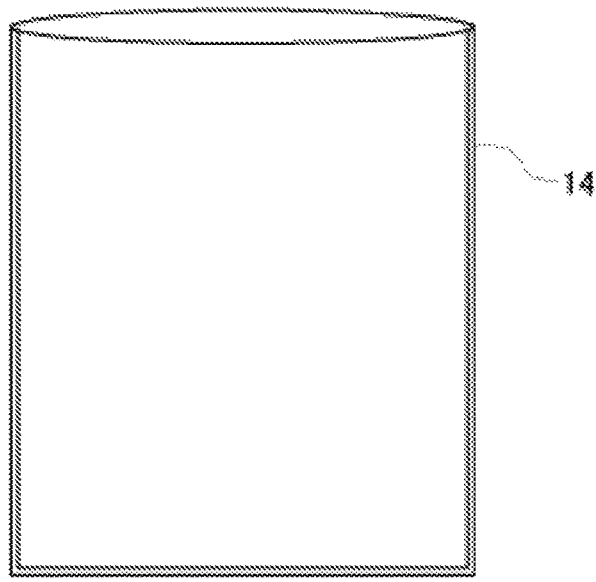
FIGS. 17A and 17B are diagrams each showing a typical card sleeve.

FIG. 17A is a diagram showing a typical card sleeve 14. The card sleeve 14 is a film case used for holding a card 10. The card sleeve 14 has an envelope shape. The user puts the card 10 in the card sleeve 14 to protect the card 10. One of the surfaces of the card sleeve 14 is made from a transparent sheet capable of transmitting visible light. On the other hand, the other surface of the card sleeve 14 is made from a nontransparent sheet incapable of transmitting visible light. Like the rear surface of the card 10a, the nontransparent sheet has one bright color. For example, the nontransparent sheet can be made from a nontransparent material having a white color.

Figure 17B:
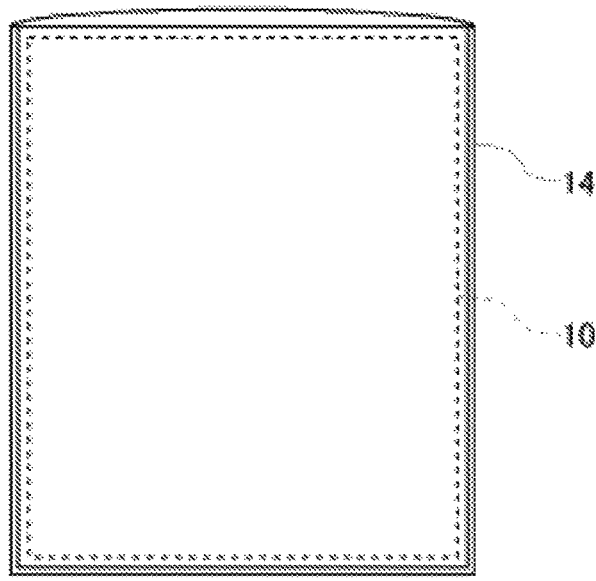

FIG. 17B shows a state in which the card 10 has been inserted into the card sleeve 14. The user inserts the card 10 into the card sleeve 14 so that, after the card 10 has been inserted into the card sleeve 14, the marker surface of the card 10 is exposed to the nontransparent sheet of the card sleeve 14. In this case, the nontransparent material of the nontransparent sheet is a material transmitting infrared light. It is to be noted that, through the transparent sheet of the card sleeve 14, the user can visually verify alphanumeric characters and a picture which have been created on the other surface of the card 10. Thus, when the card sleeve 14 is placed in the card placement area 2 so that the nontransparent sheet of the card sleeve 14 serves as the upper surface as is the case with the card 10a explained before, the infrared-light camera 200a is capable of detecting the marker of the card 10 whereas the projector 300a is capable of projecting image light on the nontransparent sheet of the card sleeve 14. As described above, even if an art of a character or the like has been printed on both the surfaces of the card 10, by covering the card surface having the marker with a nontransparent sheet made from a material not transmitting visible light but transmitting invisible light, the infrared-light camera 200a is made capable of detecting the marker from infrared light reflected by a card surface exposed to the transparent sheet whereas the projector 300a is made capable of well projecting image light which is visible light on the nontransparent sheet of the card sleeve 14.

In the embodiments, the rendering image 3 is projected on the card 10. However, it is also possible to provide a configuration in which the rendering control section 150 drives the projection apparatus 300 to project a variety of images on the basis of a movement made by a finger over the rendering image 3.

For example, a plurality of button images have been projected on the card 10 and the user touches a position at which one of the button images has been displayed. In this case, it is possible to provide a configuration in which an image for the touched button image is projected on a side of the card 10. (A typical example of the projected image is a menu image.) At that time, the detection section 110 detects the position of a finger of the user in the card placement area 2. If the position of the finger of the user coincides with the projection position of a button image, the rendering control section 150 drives the projection apparatus 300 to project a menu image associated with the button image. In addition, the rendering control section 150 may also drive the projection apparatus 300 to project an image such as the image of a computer and, in accordance with a finger movement detected by the detection section 110, project an image showing a predetermined processing result. In addition, the rendering control section 150 may also drive the projection apparatus 300 to project the image of a stopwatch as the rendering image 3.

In the embodiments described above, the projection apparatus 300 projects the rendering image 3 by taking the outer frame of the card 10 or a window frame as a reference. It is to be noted, however, that the projection apparatus 300 may also project the rendering image 3 including a character limping out of the card 10.

In addition, in the embodiments described above, if the inversion detecting unit 128 detects inversion of the card 10, a rendering operation accompanying the inversion is carried out. There are a variety of conceivable rendering operations accompanying a movement of the card. Typical examples of the card movement are a movement of the card to a position determined in advance and a fast movement of the card. In either case, in accordance with the movement of the card, the rendering control section 150 is capable of executing control to carry out a rendering operation determined in advance.

A typical application of the technology is a shogi (Japanese chess) game carried out by the user in conjunction with an opponent through a network. On the card placement area 2, a virtual board of the Japanese chess game is projected. On a card placed by the user on the board of the Japanese chess game, a shogi (Japanese chess) piece is projected. Assuming that a virtual card exists, a shogi piece of the opponent is projected on the shogi board. In the shogi game, a shogi piece captured from the opponent can be used as a shogi piece of the user. Thus, a shogi piece captured from the opponent is projected on a virtual shogi-piece yard. For a shogi piece projected on a card, the user can move the card. In addition, for a shogi piece projected without a card, the user can touch the projection position of the virtual shogi piece by making use of a finger and move the finger. In this way, the user can play a shogi game. The operations described above are implemented by the rendering control section 150.

The present technology contains subject matter related to that disclosed in Japanese Priority Patent Application JP 2013-215815 filed in the Japan Patent Office on Oct. 16, 2013, and Japanese Priority Patent Application JP 2013-205148 filed in the Japan Patent Office on Sep. 30, 2013, the entire contents of which are hereby incorporated by reference.

What is claimed is:

1. A processing apparatus comprising:
an array of card detecting sensors defining a card placement area in real space;
a processing section acquiring a position at which a physical card is placed onto a physical surface in real space, where the array of card detecting sensors are located adjacent to the physical surface, and the position is based on data received from the array of card detecting sensors; and
a rendering control section controlling projection of an image by a projection apparatus;
wherein, on the basis of the position in which said physical card is placed, said rendering control section causes said projection apparatus to project the image associated with said physical card onto said physical card in a manner larger than said physical card.

2. The processing apparatus according to claim 1, wherein said rendering control section causes said projection apparatus to project game-related information in the vicinity of said physical card.

3. The processing apparatus according to claim 1, wherein said physical card carries a plurality of identical markers.

4. The processing apparatus according to claim 1, wherein a surface of said physical card which carries the markers bears a color for reflecting the image projected by said projection apparatus in a manner visually recognizable by a user.

5. An image projecting method comprising:
receiving data from an array of card detecting sensors defining a card placement area in real space;
acquiring a position in which a physical card is placed onto a physical surface in real space, where the array of card detecting sensors are located adjacent to the physical surface, and the position is based on the data; and
on the basis of the position in which said physical card is placed, causing a projection apparatus to project an image associated with said physical card onto said physical card in a manner larger than said physical card.

6. A non-transitory, computer readable storage medium containing a computer program for a computer, which when executed by the computer causes the computer to carry out actions, comprising:
receiving data from an array of card detecting sensors defining a card placement area in real space;
acquiring a position in which a physical card is placed onto a physical surface in real space, where the array of card detecting sensors are located adjacent to the physical surface, and the position is based on the data; and
on the basis of the position in which said physical card is placed, causing a projection apparatus to project an image associated with said physical card onto said physical card in a manner larger than said physical card.

* * * * *